May 3, 1949. O. B. WARNOCK ET AL 2,469,187
POWER DIGGER AND LOADER
Filed Oct. 26, 1945 3 Sheets-Sheet 3

Inventors
Orin B. Warnock,
Robert Benner,

By Clarence A. O'Brien
and Harvey B. Jacobson
Attorneys

UNITED STATES PATENT OFFICE 2,469,187

POWER DIGGER AND LOADER

Orin B. Warnock and Robert Benner,
Nampa, Idaho

Application October 26, 1945, Serial No. 624,715

2 Claims. (Cl. 214—140)

Our invention relates to improvements in power diggers and loaders for use in loading manure, earth, gravel and the like.

The primary object of our invention is to embody with a farm tractor a digger scoop operative by forward travel of the tractor to pick up a load, together with means of simple practical form for elevating the scoop through power derived from the power takeoff of the tractor, all without altering the basic tractor structure.

Other and subordinate objects, also comprehended by our invention, together with the precise nature of our improvements and the manifold advantages thereof, will be readily understood when the succeeding description and claims are read with reference to the drawings accompanying and forming a part of this specification.

Figure 1:
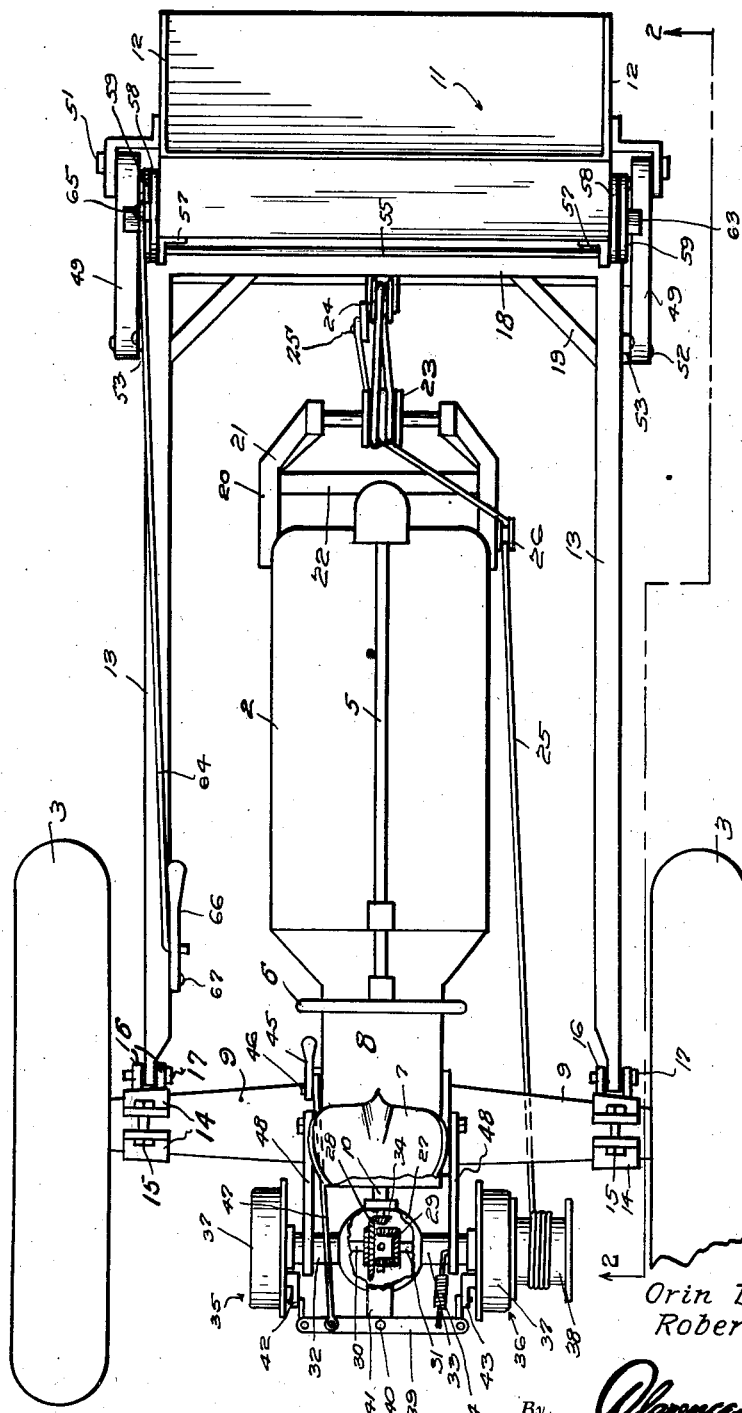
Figure 2:
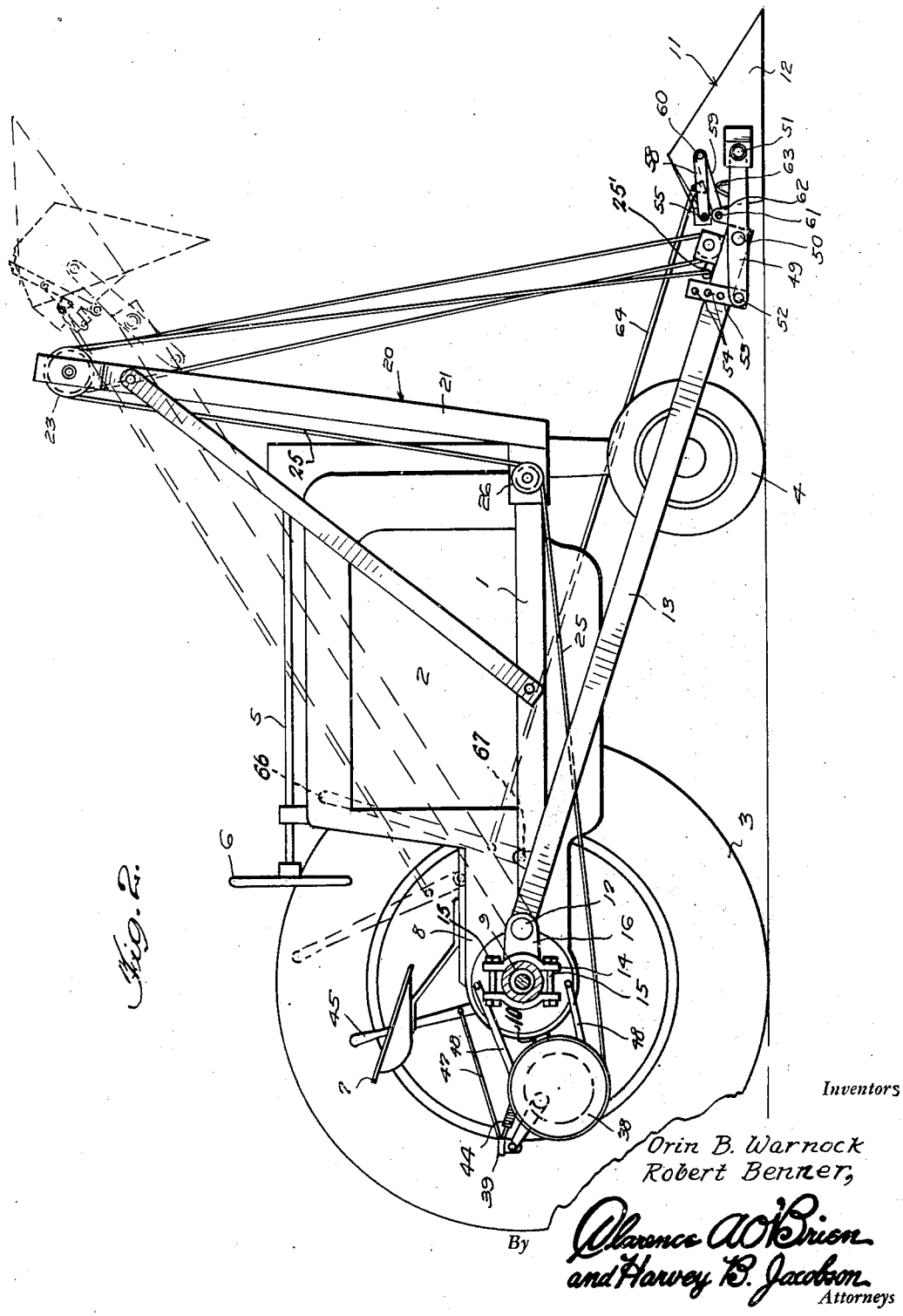
Figure 3:
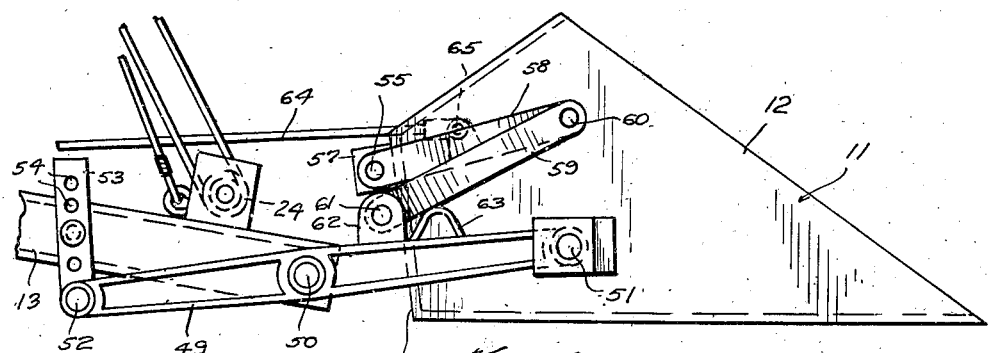
Figure 4:
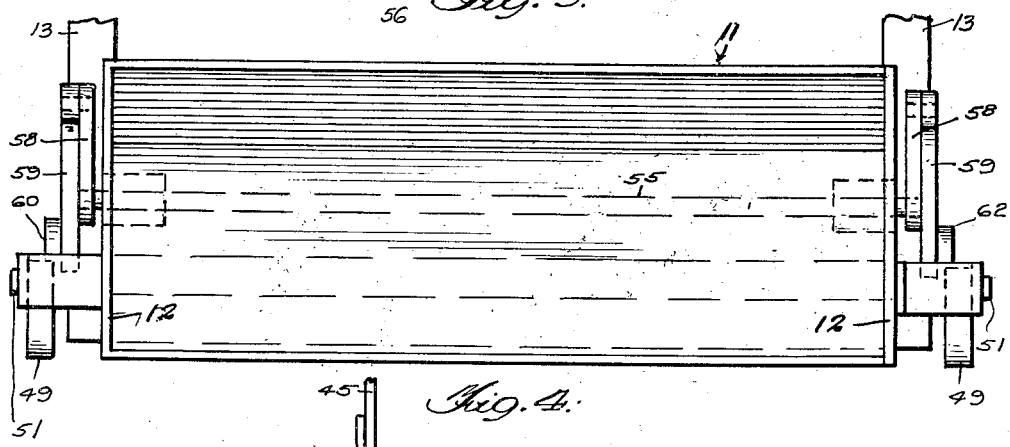
Figure 5:
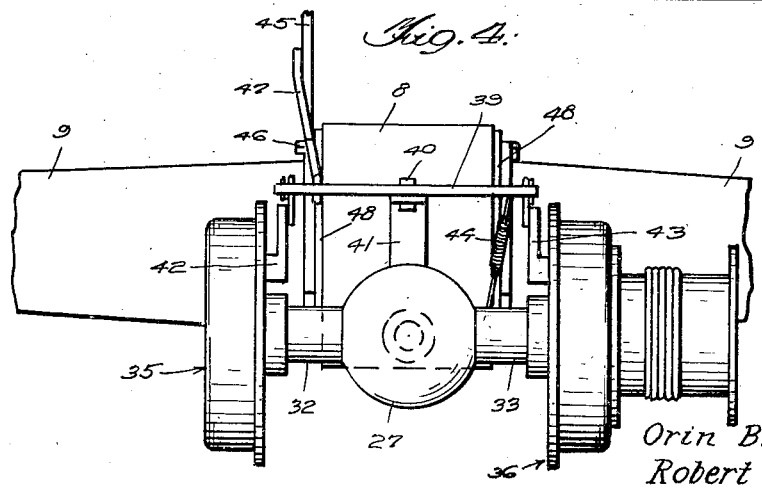

In said drawings:

Figure 1 is a view in plan, partly broken away, illustrating our invention in a preferred embodiment thereof, Figure 2 is a view in side elevation, with parts shown in section, taken on the line 2—2 of Figure 1, Figure 3 is a fragmentary view in side elevation illustrating the scoop-adjusting means and the scoop-dumping means drawn to an enlarged scale, Figure 4 is a similar view in front elevation, and Figure 5 is a fragmentary view in rear elevation of the power means for swinging the scoop-elevating and lowering frame upwardly.

Reference being had to the drawings by numerals, the type of tractor with which our invention is particularly concerned comprises a chassis frame 1 supporting a power plant, as at 2, a pair of rear traction wheels 3, and a front, caster-type, steering wheel 4 with the usual steering shaft 5 therefor extending rearwardly over the power plant 2 and equipped with a steering wheel 6 adjacent to the driver's seat 7 arising from the usual differential drive casing 8 from which the rear traction wheel axle housings 9 extend. The power take-off shaft 10 extends rearwardly out of the differential drive casing 8.

According to our invention, a digger scoop 11, preferably flat bottomed with straight sides 12, is provided forwardly of the chassis frame 1, and a pair of scoop-carrying bars 13 are pivotally mounted at rear ends thereof on the axle housings 9 for vertical swinging movement at opposite sides of the chassis frame 1 in outwardly spaced relation to said frame. The pivotal mounting for the scoop-carrying bars 13 preferably comprises pairs of clip sections 14 clamped by bolts 15 to said housings 9 with pairs of ears 16 on one section of each pair and pivot bolts 17 extending through said pairs of ears 16 and the rear ends of the scoop-carrying bars 13. A cross-bar 18 connects the front ends of the scoop-carrying bars 13 and diagonal brace bars 19 extend between said bars 13 and the bar 18. As will be seen, the scoop-carrying bars 13, together with the cross-bar 18 and the brace bars 19, form a scoop-elevating and lowering frame straddling the tractor between the traction wheels 3.

Means are provided for swinging the described scoop-elevating and lowering frame upwardly comprising the following. A sheave supporting frame 20 arises from the front end of the chassis frame 1, between the scoop-carrying bars 13 and which comprises a pair of rigid side members 21 and a connecting intermediate cross member 22. A double sheave block 23 is suitably mounted between the upper ends of the side members 21. A single sheave block 24 is suitably mounted on the cross-bar 18. A cable 25 is suitably attached at one end to the sheave block 24, as at 25 trained upwardly through the double sheave block 23, then downwardly through the single sheave block 24 and then again upwardly through the double sheave block 23 from which it then passes downwardly around a pulley 26 suitably mounted on one side of the chassis frame 1 at the front end of the frame. From the pulley 26 said cable 25 is extended rearwardly to a cable winding and unwinding mechanism now to be described.

The cable winding and unwinding mechanism is located at the rear of the differential drive casing 8 and comprises the usual differential gearing in a housing 27 and including a pair of differential gears 28, 29 fast on the ends of oppositely extending driven shafts 30, 31 suitably mounted in shaft housings 32, 33 extending from opposite sides of the housing 27. The housing 27 is located rearwardly of the differential drive casing 8, and the power takeoff shaft 10 extends into said housing 27 and is operatively connected to one of the differential gears, for instance, 28, by a bevel gear 34. A pair of brake mechanisms 35, 36, such as are used in automobiles, are provided for the driven shafts 30, 31, respectively, each of said mechanisms including a brake drum 37 fast on the shaft. A reel 38 is suitably fixed on one of the driven shafts, for instance, 31, for control by the brake mechanism 36, and the cable 25 is suitably attached to the reel 38 for winding thereon upon driving of the driven shaft 31 through the power takeoff shaft 10. A brake operating lever 39 is pivoted, as at 40, intermediate its ends, on a bracket arm 41 extending rearwardly from the housing 27, and is operatively connected at its ends, as at 42, 43, to the brake mechanisms 35, 36, to set said mechanisms upon swinging of the lever in opposite directions, respectively. A tension spring 44 suitably connected to said brake operating lever 39 and to the shaft housing 33 urges said lever 39 in a direction to release the brake mechanism 36 and set the brake mechanism 35. A brake control lever 45 is pivoted, as at 46, to the differential drive casing 8 for operation from the driver's seat 7, and is operatively connected to said brake operating lever 39 by a rod 47. Rods 48 suitably connected to the differential drive casing 8 and to the shaft housings 32, 33 support said housings.

The scoop 11 is mounted on the scoop-carrying bars 13 for vertical adjustment independently to vary the depth at which said scoop will dig below the front ends of said bars. For this purpose, a pair of scoop-adjusting arms 49 are pivoted, as at 50, intermediate the ends thereof, on the front ends of said bars 13 alongside the same and to extend forwardly thereof. The sides 12 of the scoop 11 are pivoted, as at 51, to the front ends of the scoop-adjusting arms 49. The pivots 51 provide for vertical rocking of the scoop 11 on said arms 49 for a purpose presently seen. Bolts 52 extend through the rear ends of said arms 49. Plates 53 on the scoop-carrying bars 13 with a series of vertically spaced apertures 54 for insertion of the bolts 52 therein, selectively, provide for swingably adjusting said arms 49 vertically on the scoop-carrying bars 13 to correspondingly adjust the scoop 11.

As will be understood, the pivots 51 provide for swinging of the scoop 11 about the same forwardly and downwardly into dumping position. In this connection, the following means is provided for dumping said scoop 11.

A rock shaft 55 extends across the back 56 of the scoop 11 with its ends journaled in ears 57 on said back. At opposite sides of the scoop 11, a pair of links 58, 59 are provided, on each side, with ends pivoted together in each pair, as at 60. The ends of the links 58 remote from the pivots 60 are fast on the rock shaft 55, whereas the corresponding ends of the links 59 are pivoted, as at 61, on ears 62 on the scoop-adjusting arms 49. The arrangement of the pairs of links 58, 59 is such that in the digging, or normal position of the scoop 11, said pairs of links 58, 59 form elbow joints prevented from opening, or breaking, by the links 59 which bear downwardly on stops, as at 63, arising from the scoop-adjusting arms 49 in front of the ears 62, and whereby the scoop 11 is prevented from dumping, as will be clear. A pull rod 64 is pivoted, as at 65, to one link 59 to extend rearwardly to a scoop-dumping hand lever 66 suitably pivoted, as at 67, on one of the scoop-carrying bars 13. As shown in Figure 2 in dotted lines, when the described scoop elevating and lowering frame is swung upwardly the desired distance, by pulling the hand lever 66 rearwardly, the pair of links 58, 59 are operated to open, or break joint, and thereby tilt the scoop 11 forwardly and downwardly into dumping position.

Referring now to the use and operation of the described invention, with the brake mechanism 35 set and the brake mechanism 36 normally released by the spring 44 and the brake operating lever 39, in the manner already described, the driven shaft 31 is free to idle and permit the reel 38 to unwind so that the described scoop elevating and lowering frame 13, 18, 19 may descend by gravity and lower the scoop 11 for picking up a load. This may be accomplished by driving the tractor forwardly. To elevate the scoop 11, the brake mechanism 35 is set by swinging of the brake control lever 45, clockwise, as viewed in Figure 2, thereby swinging the brake-operating lever 39, in opposition to the spring 44, in the proper direction to set said brake mechanism 35 and thus hold the driven shaft 30 stationary so that under operation of the power takeoff shaft 10, the driven shaft 31 is operated to cause the reel 38 to wind up the cable 25 and swing the described scoop elevating and lowering frame 13, 18, 19 upwardly on the pivot bolts 17. Thus, the scoop 11 and load therein is elevated in a manner which will be clear. The distance or height to which the scoop 11 is elevated may be controlled by operating the brake control lever 45, at the proper time, counter-clockwise, as viewed in Figure 2, to thereby set the brake mechanism 36 and thus hold the reel 38 stationary while the driven shaft 30 is freed for driving by the power takeoff shaft 10. The manner in which the scoop 11 is dumped has already been described.

The foregoing will, it is believed, suffice to impart a clear understanding of our invention without further explanation.

Manifestly, the invention, as described, is susceptible of modification without departing from the inventive concept, and right is herein reserved to such modifications as fall within the scope of the appended claims.

What we claim is:

1. The combination with a tractor including a chassis frame and a power take-off, of a digger scoop, a scoop elevating and lowering frame pivotally mounted on said chassis frame for vertical swinging movement, means to swing said frame upwardly by operation of said power take-off shaft, means to mount said scoop on said frame for tilting into dumping position, and means for tilting said scoop manually into dumping position operable from the tractor and comprising pairs of links on opposite sides of said scoop pivoted together and to said scoop elevating frame and scoop in each pair to form closed elbow joints, and a lever operatively connected to said links to open the joints formed thereby.

2. The combination with a tractor including a chassis frame and a power take-off shaft, of a digger scoop, a scoop elevating and lowering frame pivotally mounted on said chassis frame for vertical swinging movement, means to swing said frame upwardly by operation of said power take-off shaft, means to mount said scoop on said frame for tilting into dumping position, means for tilting said scoop manually into dumping position operable from the tractor and comprising pairs of links on opposite sides of said scoop pivoted together and to said scoop elevating frame and scoop in each pair to form closed elbow joints, a lever operatively connected to said links to open the joints formed thereby, and rests on said scoop elevating frame for supporting said pairs of links when closed to maintain the same closed under the weight of the scoop.

ORIN B. WARNOCK.
ROBERT BENNER.

REFERENCES CITED

The following references are of record in the file of this patent:

UNITED STATES PATENTS

| Number | Name | Date |
|---|---|---|
| 2,301,102 | Werthman et al. | Nov. 3, 1942 |
| 2,323,434 | Williams | July 6, 1943 |
| 2,387,656 | Gledhill | Oct. 23, 1945 |
| 2,393,299 | Denning | Jan. 22, 1946 |
| 2,397,045 | Richey | Mar. 19, 1946 |
| 2,407,425 | Horning et al. | Sept. 10, 1946 |